(No Model.)

H. H. WESTINGHOUSE.
AIR BRAKE.

No. 557,464. Patented Mar. 31, 1896.

WITNESSES:
T. J. Hogan.
F. E. Gaither

INVENTOR,
H. H. Westinghouse,
by J. Snowden Bell
Att'y.

ABLE_PRESSURE_LIMIT

UNITED STATES PATENT OFFICE.

HENRY HERMAN WESTINGHOUSE, OF PITTSBURG, PENNSYLVANIA, ASSIGNOR TO THE WESTINGHOUSE AIR BRAKE COMPANY, OF WILMERDING, PENNSYLVANIA.

AIR-BRAKE.

SPECIFICATION forming part of Letters Patent No. 557,464, dated March 31, 1896.

Application filed March 8, 1894. Serial No. 502,935. (No model.)

*To all whom it may concern:*

Be it known that I, HENRY HERMAN WESTINGHOUSE, a citizen of the United States, residing at Pittsburg, in the county of Allegheny and State of Pennsylvania, have invented or discovered certain new and useful Improvements in Air-Brakes, of which improvements the following is a specification.

The object of my invention is to provide an improvement in automatic fluid-pressure brake apparatus whereby the braking-pressure may be automatically limited to a predetermined degree which is independent of the capacity of the auxiliary reservoir or other source of fluid-pressure to supply a greater degree of pressure; and to this end it consists in a novel means for controlling and limiting the release of fluid from and the reduction of pressure in the train-pipe, in accordance with the pressure in the brake-cylinder, and thereby limiting the braking-pressure to the desired predetermined degree. The improvement claimed is hereinafter fully set forth.

Figure 1:
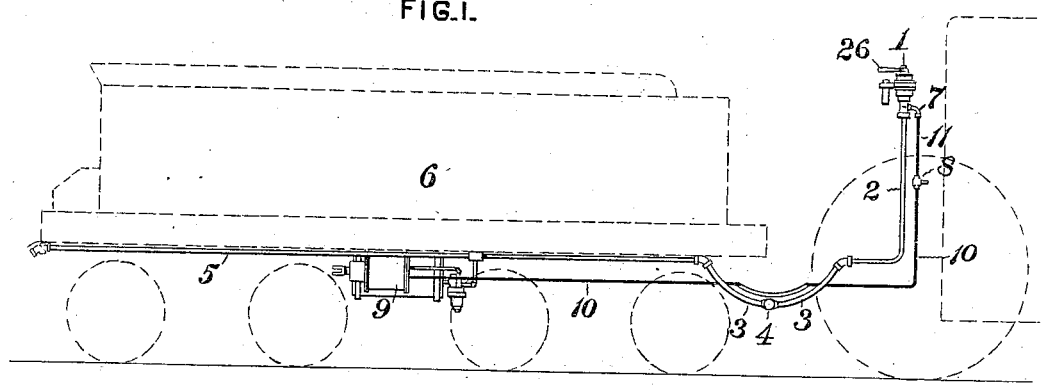
Figure 2:
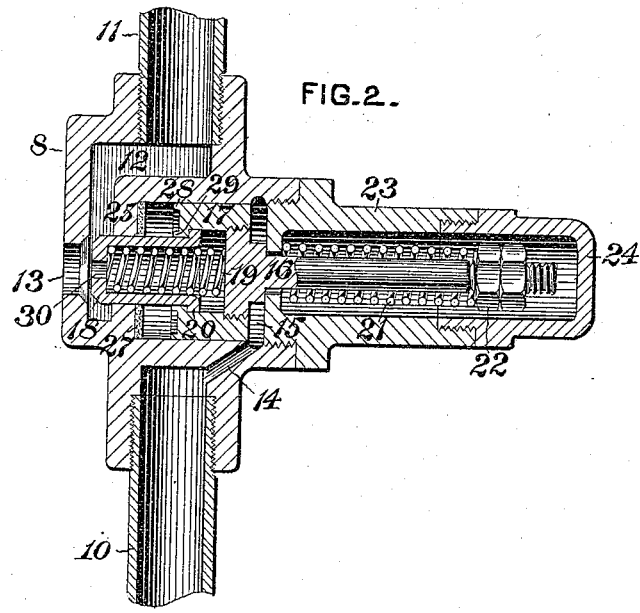
Figure 3:
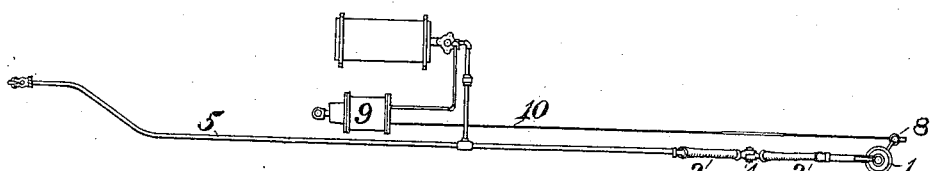

In the accompanying drawings, Figure 1 is a diagrammatic view showing in side elevation an application of my improvement in connection with an automatic fluid-pressure brake system; Fig. 2, a central section, on an enlarged scale, of a valve device adapted for use therein; and Fig. 3, a diagrammatic plan view.

In Fig. 1 of the drawings I have shown an engineer's brake-valve, a portion of a train-pipe, and a brake-cylinder on the tender, all constructed and arranged as usual in a Westinghouse automatic fluid-pressure brake system for railway-trains. My invention is not, however, limited in its application to such particular system, but is equally applicable to any other automatic fluid-pressure brake system.

The engineer's brake-valve 1 may be connected, as usual, to a section of pipe 2 on the locomotive which forms a part of the main train-pipe and is connected by means of flexible hose 3 and couplings 4 with the section of pipe 5 under the tender 6.

In the embodiment of my invention as shown in the drawings I employ, in addition to the usual construction referred to, a limiting or controlling device for governing the release of fluid from the train-pipe, and so connect the limiting or controlling device that it may be operated by means of the pressure in the brake-cylinder.

The interior of the casing 8 of the limiting device is connected by a pipe or passage 11 with the exhaust-passage 7 of the engineer's brake-valve 1 and by a pipe or passage 10 with the interior of the brake-cylinder 9. The pipe or passage 11 opens into a chamber or passage 12, communicating with the atmosphere through a normally-open port 13. The port 13 is controlled by a valve 18, which has a yielding adjustable connection with and is operated by the movement of a movable abutment 17, one side of which is exposed to the pressure in the brake-cylinder through the pipe 10, passage 14, and chamber 15.

The abutment 17 is normally held in the position shown in Fig. 2 of the drawings by means of a spring 21, which surrounds the stem 16 and bears at one end against a nut 22 or other adjustable bearing, and at its other end against the end of the tubular section 23 of the casing. The interior of the tubular section 23 communicates at its inner end with the chamber 15 and is closed at its outer end by a screw-cap 24.

The valve 18 is made hollow or tubular in form to receive a spring 19, which bears against the abutment at one end and against the valve at the other end and normally holds the valve in the position shown in Fig. 2 of the drawings, with the flange 20 on the inner end of the valve bearing against the abutment.

The valve 18 is neatly fitted in an opening in the wall or partition 25, so that it may slide easily therein without permitting the passage of fluid around it, and at the inner end of the valve the flange 20 is adapted to slide in the chamber or recess in the abutment.

In making graduated or service applications of the brakes pressure is admitted to the brake-cylinder by making a comparatively slight preliminary reduction of train-pipe pressure, and if a full service application is desired it may be obtained by successive graduated reductions of train-pipe pressure, produced by repeated movements of the engineer's brake-valve or by a single continuous but gradual reduction of train-pipe pressure until the full service-pressure is reached in the brake-cylinder. This full service-pressure may be that due to the equalization of the pressures in the auxiliary reservoir and brake-cylinder, or it may be some pressure less than the equalized pressures— that is, the auxiliary reservoirs and brake-cylinders may be so proportioned that a certain predetermined pressure which is sufficient for a full service application of the brakes may be produced in the brake-cylinders without reducing the auxiliary-reservoir pressure to the degree at which it equalizes with the brake-cylinder pressure. In either case it is important to so control the reduction of train-pipe pressure as to prevent a greater reduction than is necessary to produce the required service-pressure in the brake-cylinder, because if the reduction of train-pipe pressure is greater than necessary a waste of train-pipe fluid takes place in any case, and when the auxiliary reservoir and brake-cylinder are so proportioned that the full service-pressure is limited to an amount less than the equalized pressures in the auxiliary reservoir and brake-cylinder a waste of train-pipe fluid and auxiliary-reservoir fluid takes place and the brakes are applied with unduly great force.

It is often difficult for the engineer to decide when the full service-pressure is obtained in the brake-cylinder, and he may continue to reduce the train-pipe pressure below the amount necessary, thereby wasting fluid from the train-pipe and applying the brakes with greater force than necessary or desirable. My invention is specially intended to obviate these difficulties by automatically cutting off the flow from the train-pipe and preventing a further reduction of pressure by means of the brake-cylinder pressure, which is accumulated by such reduction and which is limited by such cutting off.

With my improvement when the engineer moves the handle 26 of the engineer's brake-valve 1 into position to make a service application of the brakes fluid from the train-pipe flows through the nozzle or passage 7 into the pipe 11, through the passage 12, and out through the passage 13 to the atmosphere, thereby reducing the train-pipe pressure and effecting the movement of the triple valve, which operates to close the brake-cylinder exhaust-passage and to admit fluid under pressure from the auxiliary reservoir to the brake-cylinder. Fluid thus admitted to the brake-cylinder enters and fills the pipe 10, the passage 14, and the chamber 15, and acts on the movable abutment or piston 17, but does not move the abutment until the full service-pressure is reached in the brake-cylinder, when the pressure of the brake-cylinder fluid acting on the abutment or piston 17 is sufficient to overcome the resistance of the spring 21, and the abutment is moved to the left.

The movement of the abutment to the left through the spring 19 moves the valve 18 to the left and closes the port or passage 13, thereby cutting off the escape of fluid from the train-pipe to the atmosphere. When the escape of fluid from the train-pipe is cut off, the reduction of train-pipe pressure ceases, and the triple valve then operates to close communication from the auxiliary reservoir to the brake-cylinder, thereby limiting the brake-cylinder pressure and preventing any further increase. After the valve 18 has been seated the brake-cylinder pressure moves the abutment 17 to the left until the ribs or ridges 28 on its face bear against the gasket 27, thereby forming a tight joint, which prevents the escape of fluid from the brake-cylinder. The opening 30 through the end of the valve 18 permits the escape of any fluid that may leak around the abutment 17 before it is seated on the gasket 27, and thereby prevents the accumulation of pressure on the left side of the abutment, which might prevent its movement at the proper time.

It will be obvious that my improvement may be applied in various ways and to various different forms of apparatus, and that it is not limited to the specific construction shown in the drawings. I have shown my improvement in connection with an engineer's brake-valve of the character of that set forth in Letters Patent No. 401,916 to George Westinghouse, Jr., and Frank Moore, dated April 23, 1889, in which there are two passages for releasing fluid from the train-pipe to the atmosphere, one for service applications and the other for emergency applications of the brakes, and my improvement is shown connected to and controlling the flow from the service-release passage; but it is not limited in its application to such particular location and connection. It may be employed in connection with other engineers' brake-valves having other arrangements of release-passages, and the location of the valve device relative to the release-passage may be varied. The pipe or passage 10 may be connected to a brake-cylinder on the tender, as shown, or to a brake-cylinder on the locomotive or on one or more cars, or, if preferred, it may be connected with any chamber or space within which the pressure varies in accordance with the pressure in the brake-cylinder.

It will be seen that my invention provides a new method of limiting the brake-cylinder pressure to a desired predetermined degree, and adds to the ordinary automatic brake system an improvement which is purely automatic, which operates not only to cut off the release from the train-pipe and to limit the brake-cylinder pressure, but also to open a passage for the release in case of a reduction of pressure in the brake-cylinder to which it is attached below the predetermined limit.

The valve device controlling the port or passage 13 through which the train-pipe fluid passes to the atmosphere may be located nearer to the brake-cylinder, if preferred—that is, it may be located in the section of pipe on the tender or on a car in case the pipe 10 is connected to a brake-cylinder on a car.

I claim as my invention and desire to secure by Letters Patent—

1. In an automatic fluid-pressure brake system, the combination, with a train-pipe an engineer's brake-valve and a brake-cylinder, of a device which is actuated by fluid-pressure accumulated in the application of the brakes, and which operates when so actuated to cut off the release of fluid from the train-pipe through the engineer's brake-valve, substantially as set forth.

2. In an automatic fluid-pressure brake system, the combination, with a train-pipe an engineer's brake-valve and a brake-cylinder, of a device which automatically controls the release of fluid from the train-pipe through the engineer's brake-valve, in making applications of the brakes, and which is independent of the pressure in the train-pipe or auxiliary reservoir, substantially as set forth.

3. In an automatic fluid-pressure brake system, the combination with a train-pipe an engineer's brake-valve and a brake-cylinder, of a passage for releasing fluid from the train-pipe by means of the engineer's brake-valve, and a valve device controlling the passage, and actuated by the pressure in the brake-cylinder, substantially as set forth.

4. In an automatic fluid-pressure brake system, the combination, with a train-pipe, a brake-cylinder and an engineer's brake-valve, of an exhaust-passage for releasing fluid from the train-pipe by means of the engineer's brake-valve, and a valve device controlling the exhaust-passage and actuated by pressure in the brake-cylinder, substantially as set forth.

5. In a railway-train automatic-brake apparatus wherein are employed a brake-cylinder, an auxiliary reservoir and a triple valve on each car, the combination therewith of a valve operated by a movable abutment, an open communication from the brake-cylinder to one side of the abutment, and a communication from the exhaust-port of the engineer's valve to an escape-port adapted to be closed by a movement of the abutment, substantially as set forth.

6. In an automatic fluid-pressure brake system, the combination, with a train-pipe, an auxiliary reservoir, and a brake-cylinder, of a device which is actuated by fluid-pressure accumulated in the application of the brakes, and which operates to cut off the release of fluid from the train-pipe and thereby to limit the admission of fluid from the auxiliary reservoir to the brake-cylinder, substantially as set forth.

7. In an automatic fluid-pressure brake system, the combination, with a train-pipe and a brake-cylinder, of a fluid-pressure-actuated device which automatically controls the release of fluid from the train-pipe, in making service applications of the brakes, and which is independent of the pressure in the train-pipe or auxiliary reservoir, substantially as set forth.

8. In an automatic fluid-pressure brake system, the combination, with a train-pipe and a brake-cylinder, of a fluid-pressure-actuated device which automatically controls the release of fluid from the train-pipe, in making service applications of the brakes, and thereby limits the admission of fluid from the auxiliary reservoir to the brake-cylinder, and which is independent of the pressure in the train-pipe or auxiliary reservoir, substantially as set forth.

9. In an automatic fluid-pressure brake system, the combination, with a train-pipe, a brake-cylinder and an auxiliary reservoir, of a release-passage through which fluid is released from the train-pipe in making service applications of the brake, and a device controlling the release-passage which is actuated by pressure in the brake-cylinder to close the release-passage and thereby to limit the pressure with which the brakes are applied, substantially as set forth.

In testimony whereof I have hereunto set my hand.

HENRY HERMAN WESTINGHOUSE.

Witnesses:
J. SNOWDEN BELL,
F. E. GAITHER.